United States Patent [19]
Itoh et al.

[11] Patent Number: 5,997,830
[45] Date of Patent: Dec. 7, 1999

[54] METHOD OF PURIFYING EXHAUST GAS FROM INTERNAL COMBUSTION ENGINE

[75] Inventors: Takashi Itoh; Yukio Kosaki, both of Ichikawa; Kazuhiko Shiokawa, Kamagaya, all of Japan

[73] Assignee: N.E. Chemcat Corporation, Tokyo, Japan

[21] Appl. No.: 08/874,484

[22] Filed: Jun. 13, 1997

Related U.S. Application Data

[63] Continuation of application No. 08/401,122, Mar. 9, 1995, abandoned.

[51] Int. Cl.[6] .................................................. B01D 53/94
[52] U.S. Cl. ......................... 423/213.5; 423/213.7; 423/239.1; 423/239.2
[58] Field of Search ................ 423/212, 213.2, 423/213.5, 213.7, 239.1, 239.2

[56] References Cited

U.S. PATENT DOCUMENTS

| | | | |
|---|---|---|---|
| 3,978,193 | 8/1976 | Fedor et al. | 423/213.7 |
| 4,678,770 | 7/1987 | Wan et al. | 423/213.5 |
| 5,313,792 | 5/1994 | Katoh et al. | 60/301 |
| 5,336,476 | 8/1994 | Kintaichi et al. | 423/212 |
| 5,413,976 | 5/1995 | Takami et al. | 423/213.2 |

FOREIGN PATENT DOCUMENTS

| | | | |
|---|---|---|---|
| 559021 | 9/1993 | European Pat. Off. | 423/213.5 |
| 0577879A1 | 1/1994 | European Pat. Off. | |
| 0605995A1 | 7/1994 | European Pat. Off. | |
| 0633052A1 | 1/1995 | European Pat. Off. | |
| 2649825 | 5/1977 | Germany | |
| 2258061 | 10/1990 | Japan | 423/213.5 |
| 9419103 | 1/1994 | WIPO | |

*Primary Examiner*—Wayne Langel
*Assistant Examiner*—Peter DiMauro
*Attorney, Agent, or Firm*—Oblon, Spivak, McClelland, Maier & Neustadt, P.C.

[57] ABSTRACT

This method comprises bringing exhaust gas from an internal combustion engine, which is operated at a fuel-lean air/fuel ratio, in contact with an iridium-containing catalyst in a first zone and then in contact with a platinum-containing catalyst in a second zone situated downstream of the first zone. This method is effective for exhaust gas from lean burn engines over a wide temperature range of 200 to 500° C., produces less $N_2O$ in a low-temperature range of 200 to 300° C., and can purify exhaust gas stably and effectively even at a high temperature of 700° C. or over.

22 Claims, 5 Drawing Sheets

$NO_x$, CO AND HC : CONVERSION
$N_2O$ : PRODUCTION RATE

NO$_x$, CO AND HC : CONVERSION
N$_2$O : PRODUCTION RATE

NO$_x$, CO AND HC : CONVERSION
N$_2$O : PRODUCTION RATE

NO$_x$, CO AND HC : CONVERSION
N$_2$O : PRODUCTION RATE

NO$_x$, CO AND HC : CONVERSION
N$_2$O : PRODUCTION RATE

NO$_x$, CO AND HC : CONVERSION
N$_2$O : PRODUCTION RATE

_5,997,830_

METHOD OF PURIFYING EXHAUST GAS FROM INTERNAL COMBUSTION ENGINE

This application is a continuation of now abandoned application, Ser. No. 08/401,122, filed Mar. 9, 1995.

BACKGROUND OF THE INVENTION

1. Field of the Invention

The present invention relates to a method of purifying exhaust gas that is discharged from internal combustion engines, which are operated at a fuel-lean air/fuel ratio, such as gasoline lean burn engines, 2-stroke engines, and diesel engines, and contains oxygen in excess to reducing components, such as hydrocarbons, and particularly to a method useful for removing nitrogen oxides.

2. Description of the Prior Art

Internal combustion engines that are operated at a fuel-lean air/fuel ratio, such as gasoline lean burn engines, and diesel engines, (hereinafter referred to as lean burn engines) are advantageous because the amount of fossil fuel required to do a certain work is less in comparison with conventional gasoline engines and the amount of exhaust of carbon dioxide ($CO_2$), a substance that causes global warming, can be decreased. However, because the exhaust gas contains oxygen in excess to reducing components, such as hydrocarbons (HC), the prior art technique of removing nitrogen oxides ($NO_x$) is unsatisfactory and therefore its wide propagation is restricted.

Conventionally, with respect to $NO_x$, nitrogen monoxide (NO) and nitrogen dioxide ($NO_2$) that are considered to cause mainly acid rain and photochemical smog have been remarked in view of the pollution control while nitrous oxide ($N_2O$) is considered harmless. However, quite recently, it is pointed out that $N_2O$ likely causes global warming and destruction of the ozonosphere and it is expected that the exhaustion of $N_2O$ is required to be restricted in the future.

In recent years, as a method of treating exhaust gas from lean burn engines for transportation means, such as automobiles, it is studied that a catalyst is used to selectively reduce $NO_x$ with HC remaining in the exhaust gas without allowing that HC to react with oxygen present in excess, and various methods are proposed wherein different catalysts are used. For example, there are proposed (1) a method wherein a zeolite catalyst a metallosilicate catalyst, or an aluminophosphate catalyst that have been ion-exchanged with a transition metal, such as Cu and Co, is used (U.S. Pat. No. 4,297,328, and Japanese Pre-examination Patent Publication (KOKAI) Nos. 63-100919, 3-127628, 3-229620, and 1-112488) and (2) a method wherein a catalyst comprising a noble metal, such as Pd, Pt, and Rh, supported on a porous metal oxide carrier, such as zeolite, alumina, silica, and titania, is used (Japanese Pre-examination Patent Publication (KOKAI) Nos. 3-221143 and 3-221144). These catalysts are required to have various characteristics, and since in some cases the exhaust gas from a lean burn engine reaches a temperature of 700° C. or more, and in particular in the case of the exhaust gas from an engine for transport vehicles, such as buses, trucks, and passenger cars, the temperature of the exhaust gas sometimes reaches as high as about 800 to 900° C. temporarily during the operation because the load on the engine changes violently, the catalyst for purifying exhaust gas is demanded to have heat resistance at such a high temperature. In addition, a long-term reliability to the extent of 100,000 to 160,000-kilometer mileage is demanded. However, the catalyst in (1) has defects that the effective temperature range where the removal of $NO_x$ occurs is 350° C. or over, which is relatively high, and that the catalyst is thermally deteriorated drastically in a steam-containing exhaust gas at 650° C. or over, and on the other hand although the catalyst in (2) allows conversion of $NO_x$ at a relatively low temperature of 200° C. to 300° C., the catalyst has problems that the effective temperature range is narrow and a considerable amount of $N_2O$ is produced concomitantly as a partial reduction product of $N_xO$.

As a method that offsets the defects of the above single catalyst system and realizes a higher efficient removal of $NO_x$, various methods are proposed which use a plurality of catalyst systems that are combined stepwise. For example, (1) a method wherein a Cu-ion-exchanged zeolite catalyst is placed in the upper stream of the flow of exhaust gas and a Pt/alumina catalyst is placed in the lower stream (Japanese Pre-examination Patent Publication (KOKAI) Nos. 1-139145 and 4-367713), (2) a method wherein a Ni or Ru/alumina catalyst is placed in the upper stream and a Pt/alumina catalyst placed in the lower stream (Japanese Pre-examination Patent Publication (KOKAI) No. 5-76776, and (3) a method wherein a Pt, Rh, or Pd/alumina catalyst is placed in the upper stream and a Cu/zeolite catalyst is placed in the lower stream (Japanese Pre-examination Patent Publication (KOKAI) No. 5-96132 are known. However, since, in the method in (1), the catalyst in the upper stream and in the method in (3), the catalyst in the lower stream are unsatisfactory in heat resistance, respectively, and in the method in (2), the $NO_x$ removal performance is unsatisfactory in a high-temperature range of 300° C. or higher, all of these methods fail to be used in practice.

Further, a two-stage catalyst system is known wherein a catalyst comprising rhodium or iridium is placed in the upper stream and a catalyst comprising platinum or palladium is placed in the lower stream (Japanese Pre-examination Patent Publication (KOKAI) No. 52-65177). However, this catalyst system is intended to purify exhaust gas from an internal combustion engine that is operated at an air/fuel ratio of about 14.6 where the reducing components and the oxidizing components in the exhaust gas are equivalent, so that the catalyst system is not effective to purify the exhaust gas from lean burn engines that are operated in the presence of excess oxygen and the removal of $NO_x$ proceeds scarcely.

Further, a method wherein the exhaust gas from a lean burn engine is purified by using a catalyst comprising iridium and platinum, in coexistence manner, supported on a metallosilicate carrier is known (Japanese Pre-examination Patent Publication (KOKAI) No. 5-245386). However, in the catalyst used in this method, the light-off (catalyst inlet temperature versus conversion) performance curve of $NO_x$, HC, and CO is similar to that of a catalyst supported only platinum and any substantial effect due to the action of iridium cannot be observed. The performance of the removal of $NO_x$ is still unsatisfactory. It is assumed that, probably, when exhaust gas comes in contact with such a co-supporting catalyst, out of HC's that are to act as reducing agents for $NO_x$ present in the exhaust gas, more reactive olefinic HC's interact first with platinum that is higher in oxidizing ability, and as a result, $N_2O$ is produced as a reduction product of $NO_x$ in the low-temperature zone and the olefinic HC's are oxidized to $CO_2$ completely in the higher-temperature zone.

SUMMARY OF THE INVENTION

Therefore, an object of the present invention is to solve the defects of the above prior methods and more particularly to provide a method of purifying exhaust gas from a lean burn engine that is effective over a wide temperature range of 200 to 500° C., produces less $N_2O$ in a low-temperature range of 200 to 300° C., and does not lose its effect even when exposed to a high temperature of 700° C. or over.

According to the present invention, as a means of attaining the above object, there is provided a method of purifying exhaust gas from an internal combustion engine that is operated at a fuel-lean air/fuel ratio, comprising bringing the exhaust gas in contact with an iridium-containing catalyst in a first zone and then in contact with a platinum-containing catalyst in a second zone situated downstream of the first zone.

The present exhaust gas purifying method is applied to exhaust gas from lean burn engines: the method (1) is particularly effective on exhaust gas over a wide temperature range of 200 to 500° C., (2) make maximum use of HC species in the exhaust gas as a reducing agent, (3) produces less $N_2O$ even in a low temperature range of 200 to 300° C., and (4) the catalyst used in the method has heat resistance at a high temperature of 700° C. or more, even in the presence of steam, and the method can be carried out to purify exhaust gas stably and efficiently over a long period of time.

DETAILED DESCRIPTION OF THE INVENTION

Catalysts in the First Zone

Figure 1:
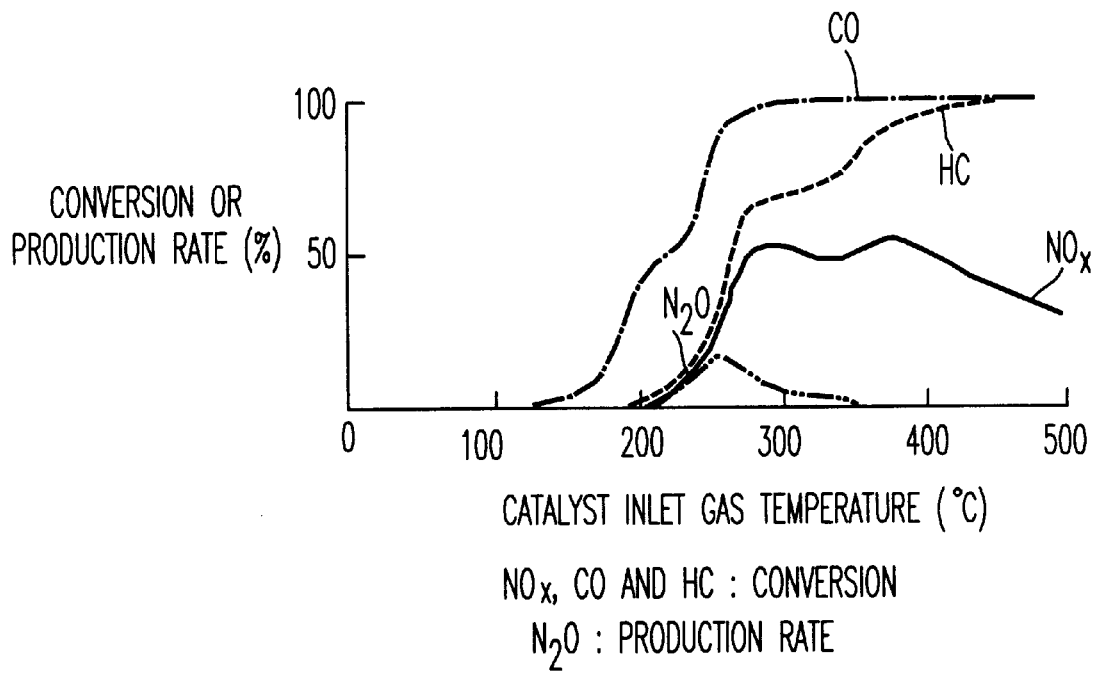
FIG. 1 is a graph showing the purifying performance on the model exhaust gas from a lean burn engine obtained in Example 1.

In the present exhaust gas purifying method, the iridium-containing catalyst that is placed in the first zone in the upper stream of the flow of exhaust gas is not particularly restricted so long as the catalyst contains iridium and does not contain platinum. Preferably, the catalyst comprises iridium supported on at least any one porous carrier selected from the group consisting of refractory metal oxide carriers, such as an alumina, e.g., γ-alumina and α-alumina, silica, titania, zirconia, magnesia, cerium oxide, and tin oxide; refractory metal carbide carriers, such as silicon carbide, titanium carbide, tungsten carbide, boron carbide, vanadium carbide, and tantalum carbide; and refractory metal nitride carriers, such as titanium nitride, chromium nitride, and zirconium nitride. The process for the production of these iridium-containing catalysts is not particularly restricted and the conventional method, such as the impregnation method, the adsorption method, the ion-exchange method, and the sol/gel method, can be applied.

Out of the iridium-containing catalysts, particularly preferable iridium-containing catalysts are the following Catalyst (A) and Catalyst (B). Catalyst (A) is a catalyst proposed by the present applicant in Japanese Pre-examination Patent Publication (KOKAI) No. 6-31173.

Catalyst (A)

Catalyst (A) is a catalyst comprising iridium supported on at least one carrier selected from the group consisting of metal carbides and metal nitrides.

The metal carbide that can be used as a carrier of said catalyst includes, for example, silicon carbide, titanium carbide, boron carbide, vanadium carbide, and tantalum carbide, and the metal nitride that can be used as a carrier of said catalyst includes, for example, titanium nitride, chromium nitride, and zirconium nitride. These may be used singly or may be used as a combination of two or more. Among the above examples, silicon carbide, titanium carbide, or titanium nitride, or a combination of two or more of these is preferred.

The form of the metal carbide and the metal nitride is not particularly restricted so long as they are stable at at least 800° C., and preferably at least 1,000° C., in the air in the presence of steam. Inexpensively available one is, for example, commercially available one in the form of whiskers or powders having a particle diameter of about 0.1 to 100 μm.

Conventionally, it is an established theory that, out of Ir catalysts for purifying exhaust gas, those comprising Ir catalyst particles supported on a porous metal oxide carrier having a high specific surface area, the Ir catalyst particles being highly dispersed and having a very small particle diameter, exhibit a high activity and a high selectivity for the $NO_x$ reduction reaction (e.g., K. C. Taylor and J. C. Schlatter, J. Catal., 63 (1) 53–71 (1980)). However, this Catalyst (A) has a unique feature that because the carrier is not a metal oxide but a metal carbide or a metal nitride and also is low in specific surface area and non-porous, the Catalyst (A) has, at a high temperature in the presence of steam, a high activity and a long life for the removal of $NO_x$ in the exhaust gas, which contains stoichiometrically excess oxygen, from lean burn engines.

That is, preferably the metal carbide and the metal nitride used as a carrier have generally a BET specific surface area of 30 $m^2/g$ or less, and more preferably 15 $m^2/g$ or less, and a pore volume of 0.55 $cm^3/g$ or less, and more preferably 0.5 $cm^3/g$ or less.

The state of the Ir supported on the above carrier is not particularly restricted, but preferably the Ir supported on the above carrier is present in the metal state, or in the state of an oxide, such as IrO, $Ir_2O_3$, and $IrO_2$, or in the state of a mixture of these. Preferably these Ir's have an average particle diameter of 2 to 100 nm, and more preferably 5 to 20 nm, and are dispersed and supported on the carrier.

The amount of Ir to be supported on the carrier is preferably 0.005 to 10.0% by weight, and more preferably 0.1 to 2.0% by weight.

The method of supporting Ir on the carrier to prepare the catalyst is not particularly restricted and any conventionally known method can be followed.

For example, the catalyst is prepared in such a manner that the carrier is impregnated with an aqueous solution of a soluble salt of iridium, such as iridium trichloride ($IrCl_3$), chloroiridic acid ($H_2IrCl_6$), sodium chloroiridate ($Na_3IrCl_6$), sodium chloroiridate ($Na_2IrCl_6$), potassium chloroiridate ($K_3IrCl_6$), potassium chloroiridate ($K_2IrCl_6$), iridium nitrate ($Ir(NO_3)_4$), or iridium sulfate ($Ir(SO_4)_2$), then is dried, and is calcined to decompose the compound. Alternatively, the catalyst may be prepared in such a manner that an organic metal complex of Ir, such as $Ir_4(CO)_{12}$ is dissolved in an organic solvent, such as hexane and ethanol, and the carrier is impregnated with the resulting solution, and then is calcined to decompose the compound. In any case, the atmosphere in which the Ir compound impregnated as a catalyst precursor into the carrier is calcined to be decomposed is suitably selected depending on the kind of the precursor, and for example the calcination for the decomposition is carried out in air, in vacuo, in a stream of an inert gas, such as nitrogen, or in a stream of hydrogen. Preferably the calcination temperature is generally 300 to 900° C., and more preferably 600 to 800° C., and preferably the calcination time is generally about 30 min to 10 hours.

The calcination may be carried out stepwise by combining a plurality of treatments. For example, it is possible that after the carrier impregnated with the Ir compound is calcined in air, the reduction is carried out in a stream of hydrogen.

Further, the once prepared catalyst may be subjected to a stabilizing treatment by calcining it at 650 to 800° C. for 30 min to 5 hours under a stream containing 10 to 100% of steam (the rest being air or nitrogen). Such a heat treatment makes the Ir become metallic Ir or an Ir oxide having a crystal diameter of about 5 to 20 nm.

Catalyst (A) optionally after mixed with a suitable binder may be molded into a suitable shape, such as pellets, balls, rings, and a honeycomb, or Catalyst (A) may be prepared by impregnating a carrier previously molded into a suitable shape with Ir so that the Ir may be supported on the carrier.

Also Catalyst (A) may be used by coating (for example, wash-coating) Catalyst (A) together with a suitable binder or without any binder on the surface of a suitably molded refractory support substrate, for example, a molded honeycomb of a ceramic, such as cordierite and mullite, or a webbed honeycomb of a stainless steel. In this case, the coating amount on the support substrate is preferably 20 to 200 g/liter, and more preferably 60 to 120 g/liter, per unit volume of the support substrate, and the supported amount of Ir per unit volume of the support substrate is preferably in the range of 0.01 to 5.0 g/liter, and more preferably 0.1 to 1.5 g/liter.

As the binder, a conventional inorganic binder, such as, silica sol, alumina sol, and titania sol, can be used.

The wash-coating of the catalyst powder onto a refractory support substrate may be carried out, for example, in such a manner that silica sol and water are added to the catalyst powder, followed by kneading to form a thixotropic slurry, and then the refractory support substrate is dipped in the thixotropic slurry, followed by drying and calcination.

Catalyst (B)

Catalyst (B) is a catalyst comprising a crystalline iridium silicate, and preferably a catalyst comprising a crystalline iridium silicate having an Si/Ir atomic ratio of at least 50 and at most 800, and an Si/Al atomic ratio of at least 15.

This catalyst comprises a crystalline iridium silicate having an Si/Ir atomic ratio of 50 to 800, and preferably 70 to 500, and an Si/Al atomic ratio of at least 15, and preferably 30 to 1,000.

The crystal form of the crystalline iridium silicate is not particularly restricted and may be any crystal form so long as the high-silica metallosilicate can take a stable crystal form, for example, of the MFI type, the MEL type, the MOR type, the FER type, the TON type, the MTT type, the MTW type, or the Beta type, with particular preference being given to the MFI type and the MEL type.

A preferable composition of the crystalline iridium silicate is, for example, represented by the following formula (1):

$$xM_2O \cdot yAl_2O_3 \cdot IrO_2 \cdot zSiO_2 \cdot wH_2O \qquad (1)$$

wherein M represents an alkali metal, and x, y, z, and w are respectively such numbers that the numbers satisfy $0<x/y\leq 5.0$, $0<y\leq 10$, $50\leq z\leq 800$, $z/y\geq 30$, and $0.01\leq w/z<0.5$.

In the formula (1), M represents at least one alkali metal selected from the group consisting of Li, Na, K, Rb, and Cs. $M_2O$ represents $M_2O$ originated from the cation species $M^+$, which is introduced on the ion-exchange site by means of the hydrothermal synthesis of the crystalline iridium silicate or by means of the subsequent ion-exchange operation to supplement the difference +1 of the valence of $Al^{3+}$ substituted on $Si^{4+}$ of the silicate skeleton, and also $M_2O$ indicating a free alkali metal oxide occluded in the silicate crystal other than the ion-exchange site.

In the formula (1), the molar ratio x/y of the alkali metal oxide to $Al_2O_3$ is $0<x/y\leq 5.0$, and preferably $0<x/y\leq 3.0$. Further, in that range of x/y, if x/y>1, there is a free alkali metal oxide $M_2O$ in the silicate crystal in addition to the alkali metal present on the ion-exchange site. If x/y>5.0, the catalytic activity is lowered unpreferably. Further, the ion-exchange of the alkali metal ion on the ion-exchange site for $H^+$ results in $0<x/y<1$.

In the formula (1), y represents the molar ratio of $Al_2O_3$ to $IrO_2$, and is such that $0<y\leq 10$, and preferably $0<y\leq 5$. If y>10, the content of Ir in the crystalline iridium silicate is too low compared with $Al_2O_3$, and the effect of the Ir added is not exhibited, thereby lowering the catalytic activity.

In the formula (1), z represents the molar ratio of $SiO_2$ to $IrO_2$ and is such that $50\leq z\leq 800$, and more preferably $70\leq z\leq 500$. If $z\geq 50$, in its X-ray crystal diffraction pattern, only diffraction peaks attributable to the crystalline silicate structure are detected and diffraction peaks attributable to the free $IrO_2$ other than that are not detected. On the other hand, if z<50, diffraction peaks attributable to the free $IrO_2$, which peaks overlap with the diffraction peaks attributable to the crystalline silicate structure, are detected. In this case, the ratio of the Ir outside the silicate skeleton to the Ir occluded in the silicate skeleton becomes high, the agglomeration or volatilization of $IrO_2$ under a high temperature-oxidizing atmosphere proceeds and the heat resistance of the catalyst is liable to lower. Further, if z>800, the content of Ir is too low, so that the catalytic activity is lowered.

Further, z is also prescribed by the molar ratio z/y of $SiO_2$ to $Al_2O_3$, and the crystalline silicate is required to be a low-alumina high-silica metallosilicate with $z/y\geq 30$, and more preferably $z/y\geq 300$. If the content of $Al_2O_3$ is high with z/y<30, and the catalyst is used for purifying exhaust gas, the selectivity for the $NO_x$ reduction is not only lowered, but also the removal of aluminum under an atmosphere in the presence of a high-temperature steam proceeds gradually and the catalytic activity is deteriorated unpreferably.

w represents the rate of $H_2O$ originated from $H^+$ present on the ion-exchange site and the water of crystallization in the crystal structure, is not particularly restricted, and generally is in the range of $0.01 \leq w/z \leq 0.5$, and preferably $0.05 \leq w/z \leq 0.2$.

The performance of Catalyst (B) is quite specific in comparison with metallosilicates having a similar structure formed by replacing the iridium with other metal element. That is, platinum silicate, rhodium silicate, and palladium silicate, which have a similar structure and composition, are high in oxidizing activity only for HC and exhibit scarcely the selectivity for the reduction of $NO_x$ while the above crystalline iridium silicate has a controlled but sufficient oxidizing ability for CO and HC and a high selective reducing ability for $NO_x$.

The catalyst that is obtained by exchanging the $H^+$ and/or alkali metal ion on the ion-exchange site of said crystalline iridium silicate for a transition metal ion, such as a Cu, Co, Fe, or Ni ion as taught by Japanese Pre-examination Patent Publication (KOKAI) No. 3-127628 and so on is not preferable because the catalyst is poor in hydrothermal durability of the catalyst in comparison with the catalyst which has not been ion-exchanged for a transition metal ion.

The crystalline iridium silicate that constitutes Catalyst (B) is prepared in accordance with the known process of synthesizing a high-silica zeolite with the exception that an iridium source is also present in the step of preparing a gel. To obtain the crystalline iridium silicate, for example, (1) an iridium source, a silicon source, and an alkali metal compound are mixed, with an aluminum source optionally being added, in the presence or absence of a suitable template agent to prepare a gel, and the gel is placed under hydrothermal synthesis conditions to be crystallized, followed by calcination under an atmosphere containing oxygen at a temperature in the range of 400 to 900° C., and preferably in the range of 500 to 700° C., or (2) an iridium source, a silicon source, an aluminum source, and an alkali are mixed in the presence or absence of a suitable template agent to prepare a gel, the gel is placed under hydrothermal synthesis conditions to be crystallized, followed by calcination under an atmosphere containing oxygen to obtain an aluminum-containing crystalline iridium silicate, and the aluminum-containing crystalline iridium silicate is subjected to treatment of removing aluminum as the silicate skeleton structure is retained.

The template agent used in Processes (1) and (2) is suitably selected in accordance with the crystal form of the iridium silicate to be synthesized. To synthesize iridium silicates of the MFI type and the MEL type, preferably use is made of a quaternary phosphonium hydroxide compound or quaternary ammonium hydroxide compound represented by the following formula (2):

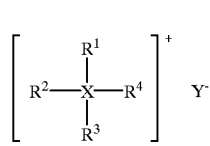

(2)

wherein X represents a nitrogen atom or a phosphorus atom, $R^1$, $R^2$, $R^3$, and $R^4$, which may be the same or different, each represent a hydrocarbon group, such as an alkyl group, for example, methyl, ethyl, propyl, butyl, pentyl, or hexyl, or an aralkyl group, for example, benzyl, and Y represents an anion, such as a hydroxide ion, a chloride ion, a bromide ion, or an iodide ion.

In Process (1), even if an aluminum source is not particularly intentionally added to the hydrothermal synthesis gel, generally aluminum as an unavoidable impurity of the silicon source is mixed into the gel to provide the produced iridium silicate with an $Al_2O_3$ moiety in the composition formula.

In Process (2), when the hydrothermal synthesis is carried out, a certain amount of an aluminum source is intentionally added to the gel to obtain a crystalline aluminoiridium silicate having a relatively high $Al_2O_3$ content (e.g., z/y<30), and the crystalline aluminoiridium silicate is subjected to a treatment of removing aluminum in a suitable manner, as the silicate skeleton structure is retained, to obtain the intended crystalline aluminoiridium silicate having a low $Al_2O_3$ content ($z/y \geq 30$).

According to Process (2), crystalline iridium silicates with various skeleton structures, which cannot be obtained by Process (1), can be obtained.

As the silicon source in Processes (1) and (2), for example, water glass, silica sol, silica gel, and fumed silica are used. Further, as the iridium source, for example, various iridic acids and their salts, such as iridium chloride ($IrCl_3$), chloroiridic acid ($H_2IrCl_6$), ammonium chloroiridate (($NH_4$)$_3$ $IrCl_6$), ammonium chloroiridate (($NH_4$)$_2IrCl_6$), sodium chloroiridate ($Na_3IrCl_6$), sodium chloroiridate ($Na_2IrCl_6$), potassium chloroiridate ($K_3IrCl_6$), potassium chloroiridate ($K_2IrCl_6$), iridium sulfate ($Ir(SO_4)_2$), and iridium nitrate ($Ir(NO_3)_4$); organometallic complexes, such as $Ir_4(CO)_{12}$; hydroxides, such as $Ir(OH)4$; and oxides, such as $Ir_2O_3$ and $IrO_2$, can be used.

In Processes (1) and (2), as the alumina source that will be added intentionally, for example, aluminum nitrate; sodium aluminate; alumina sol; boehmite gel; and various transition aluminas, such as γ-alumina, θ-alumina, δ-alumina, and η-alumina, can be used.

As the alkali metal compound, at least one selected from the group consisting of ammonium hydroxide, lithium hydroxide, sodium hydroxide, potassium hydroxide, rubidium hydroxide, and cesium hydroxide is used.

The hydrothermal synthesis of Processes (1) and (2) is carried out such that the raw material gel is kept either under normal pressure and reflux conditions or in a closed autoclave under autogenous reaction pressure at 100 to 250° C. for 5 to 200 hours.

The reaction product is filtered, washed, dried, and then calcined in an oxygen-containing atmosphere, and preferably in air, at a temperature in the range of 400 to 900° C., and preferably in the range of 500 to 700° C., for 2 to 20 hours, and preferably 4 to 10 hours.

Through this calcination step, the crystalline iridium silicate according to Process (1) and the crystalline aluminoiridium silicate according to Process (2) are obtained as the proton type; the alkali metal ion type, such as the Na ion type; or the mixture type of these. The crystalline iridium silicate obtained as the alkali ion type by the above procedure may be converted into the crystalline iridium silicate of the proton type by the conventional ion-exchange procedure.

The method of removing aluminum in Process (2) is selected suitably from a mineral acid treatment, a fluorine compound treatment, a high-temperature steam treatment, and the like so that the silicate skeleton may not be broken by the treatment with the structural stability of the precursor aluminoiridium silicate crystal form being taken into account. For example, for the precursor of the MFI type, the MEL type, and the MOR type, for example, a process wherein the precursor is kept in an aqueous solution of 8N to 10N hydrochloric acid at 90 to 100° C. for 1 to 10 hours can be employed.

In the crystalline iridium silicate of Catalyst (B), it is presumed that the iridium is present mainly in the silicate skeleton by replacing Si, but part of the iridium may be present as fine crystals of iridium oxide $IrO_2$ outside the skeleton. However, such fine crystals of $IrO_2$ are detected scarcely by the powder method of X-ray diffraction.

Although the catalyst in the first zone contains iridium as a catalytic active component, the catalyst in the first zone may contain, in addition to iridium, other co-catalyst component supported together with iridium which improves the performance of the iridium-containing catalyst as an exhaust gas-purifying catalyst. For example, Mg, Ca and Ba may be supported in such an amount that does not hamper the catalytic activity of iridium (for example, at a ratio of from 1:10 to 10:1 in terms of the atomic ratio of the added element to the iridium atom).

However, out of platinum group elements, platinum and palladium, and particularly platinum, is not supported together with iridium because platinum hampers unpreferably the function of the iridium catalyst as the catalyst in the first zone.

Catalysts in the Second Zone

The catalyst in the second zone is required to contain platinum as a catalytic active component. This platinum component may be in any state, for example, the metal elemental state, the state of platinum oxides such as PtO and $PtO_2$, the state of alloys of platinum and other metal, the state of composite oxides of platinum and other metal, etc. The platinum component is generally used with being supported on a porous carrier.

The carrier for the platinum-containing catalyst is not particularly restricted and as the carrier of the platinum-containing catalyst, the above-exemplified refractory metal oxide carriers, refractory metal carbide carriers, and refractory metal nitride carriers, and mixtures or composites of these may be used. Preferably the average particle diameter of the platinum is about 2 to 300 nm, and preferably the amount of the platinum to be supported on the carrier is about 0.1 to 10% by weight.

Said platinum-containing catalyst may have, in addition to platinum, other co-catalyst component supported together with platinum which improves the performance of the platinum-containing catalyst as an exhaust gas-purifying catalyst. Such a co-catalyst component includes, for example, alkaline earth metals, such as Mg, Ca, Ba, and Sr; rare earth metals, such as La, Ce, Nd, Yb, and Sm; and transition metal elements, such as V, Nb, Ta, W, Fe, Co, Ni, Cu, Ru, Ir, Rh, Pd, Re, Ag, and Au. These may be supported in such an amount that does not hamper the activity of the platinum catalyst (for example, at a ratio of from 1:10 to 10:1 in terms the atomic ratio of the metal element of the co-catalyst to the platinum).

The method of producing the platinum-containing catalyst is also not particularly restricted and the conventional method, such as the impregnation method, the adsorption method, and the ion-exchange method as well as the electroless platinum plating method can be used.

As a preferable example of the platinum-containing catalyst, one obtained by using an electroless plating method proposed in Japanese Patent Application No.5- 247428 (filed on Sep. 8, 1993) can be mentioned. Said catalyst is a catalyst comprising a carrier portion comprised of a monolithic support substrate having through holes and made of a refractory ceramic or a metal, and a coating layer provided on the wall surface of said monolithic support substrate where the stream of a gas will be in contact with and is made of at least one selected from the group consisting of refractory metal oxides and refractory metal carbides; and platinum supported on the coating layer of the carrier portion by electroless plating. Generally, said catalyst will be arranged along the direction of the flow of exhaust gas so that the flow of the exhaust gas may pass through said through-holes.

As the substrate that constitutes said catalyst, a monolithic substrate having through-holes extending from one end surface to the opposite end surface and made of a refractory ceramic or a refractory metal is used. As the monolithic substrate of a ceramic or a metal, for example, a honeycomb or corrugated substrate of mullite, cordierite, silicon carbide or the like can be used, and as the monolithic substrate of a metal, for example, a honeycomb substrate of an austenitic stainless steal or a ferrite stainless steal can be exemplified.

As the coating layer, a coating layer of a refractory metal oxide and/or a metal carbide is used. As the refractory metal oxide and metal carbide, for example, aluminas, such as $\gamma$-alumina and $\alpha$-alumina, magnesia, zirconia, titania, cerium oxide, tin oxide, silica, silicon carbide, titanium carbide, tungsten carbide, boron carbide, vanadium carbide, and tantalum carbide, and a mixture or a composite (e.g., zeolite) of these can be exemplified with preference being given to $\gamma$-alumina, zirconia, cerium oxide, or silicon carbide, or a mixture of these. These are used by coating them using a binder, such as silica and alumina, on said monolithic substrate. Hereinafter, one which obtained by forming a coating layer of a carrier on a substrate is called a carrier-coated substrate.

Further, as an active metal, platinum having an average particle diameter in the range of preferably 2 to 300 nm, and particularly 5 to 200 nm, observed under a scanning electron microscope (SEM) is used, and preferably, the platinum is contained in an amount of 0.5 to 8 g/liter, and particularly 1 to 6 g/liter, based on said monolithic substrate. If the content of platinum is too small, the catalytic activity is sometimes lowered while if the content of platinum is excessive, the corresponding effect cannot be sometimes obtained, and not only the preparation of the catalyst becomes difficult but also it becomes uneconomical sometimes.

To make said catalyst, for example, chloroplatinic acid is supported on a carrier so that the carrier may be impregnated with the chloroplatinic acid in an amount of 0.2% by weight in terms of platinum, followed by calcination at 600° C., and the resulting powder is coated on a monolithic substrate. The resulting pre-treated carrier-coated substrate is generally activated with a reducing agent solution, and preferably a hydrazine solution. Thereafter, for example, said catalyst is produced in such a way that the pretreated carrier-coated substrate is dipped in an electroless platinum plating solution having a composition, for example, containing chloroplatinic acid (1 g/liter in terms of platinum), ammonia water in an amount of 200 ml/liter, and a 50 wt. % hydrazine solution in an amount of 4 g/liter to plate the pretreated carrier-coated layer with platinum to support the platinum on the pretreated carrier-coated layer, and the pretreated carrier-coated substrate is dried and calcined at 400 to 800° C.

The shape of the iridium-containing catalyst in the first zone and the platinum-containing catalyst in the second zone that are used in the present exhaust gas-purifying method is also not particularly restricted so long as a packed layer can be formed which allows all the amount of the exhaust gas to be passed through it without increasing the back pressure considerably. Each of the catalyst powders itself may be molded into a certain shape, such as balls, pellets and rings, or, as described above in the preferable examples, each of the catalyst powders may be used by coating it on a substrate of a conventional refractory material, such as alumina, silica, and titania, which has been previously molded into the shape of balls, pellets, or rings. Particularly preferably, one which obtained by coating a catalyst substance by the wash coating method or the sol/gel method on the surface of a support substrate which is made of a refractory material, such as a refractory ceramic for example, cordierite, mullite, and α-alumina, and a refractory stainless steel, and has a monolithic structure, for example, like a honeycomb and a foam, with a plurality of through-holes in the direction of the flow of exhaust gas is used.

In this case, separate such catalyst-coated structures may be placed in the upper stream and the lower stream respectively or the present catalysts may be used in such a way that they are formed into a single catalyst structure having a single support substrate wherein the exhaust gas inlet side section is coated with the iridium-containing catalyst and the exhaust gas outlet side section coated with the platinum-containing catalyst. However, the position of the first catalyst zone and the position of the second catalyst zone are definitely divided and it is not preferable that the exhaust gas which has not been passed through the iridium-containing catalyst is first brought in contact with the platinum-containing catalyst.

Method of Treating Exhaust Gas

In the present exhaust gas treating method, at the time when the exhaust gas is brought in contact with the catalysts, the temperature of the exhaust gas may be the same as that of the exhaust gas from the lean burn engine, but preferably is 150 to 700° C., and more preferably 200 to 500° C., and, particularly more preferably the first-catalyst zone inlet gas temperature is 300 to 500° C. and the second-catalyst zone inlet gas temperature is 200 to 350° C.

In the present exhaust gas treating method, there is no particular restriction on the gas space velocity (SV) at which the exhaust gas is brought in contact with the first and second catalyst zones, but preferably the gas space velocity at which the exhaust gas is brought in contact with the first catalyst zone or the gas space velocity at which the exhaust gas is brought in contact with the second catalyst zone are 5,000/hr to 150,000/hr. The ratio $SV_1/SV_2$ of the space velocity at the first zone to the space velocity at the second zone is not particularly restricted, but preferably $3>(SV_1/SV_2)>0.3$, and more preferably $1.5>(SV_1/SV_2)>0.5$.

In the case, like the exhaust gas from diesel engines, where the removal of $NO_x$ with only HC in the raw exhaust gas is unsatisfactory in the high-oxygen concentration zone, it is possible without deteriorating excessively the fuel economy to secure a satisfactory high $NO_x$ removal rate by adding a necessary minimum amount of a hydrocarbon type reducing agent from outside into the path of the flow of the exhaust gas between the primary emission source of the exhaust gas and the catalyst layer.

As the reducing agent added, for example, saturated or unsaturated hydrocarbons having 2 to 18 carbon atoms or oxygenated hydrocarbons, which are their partially oxidized products, are used. Among them, unsaturated hydrocarbons having 2 to 10 carbon atoms, such as ethylene, propylene, butene, hexene, octene, toluene, xylene, or cumene, are particularly preferable. Also, general-purpose fuels for internal combustion engines, such as gasoline, kerosene, gas oil, methanol, and ethanol, themselves can be used as an additional reducing agent. These hydrocarbons are previously vaporized and then are added or are added by spraying the liquid of them, so that they are mixed with the raw exhaust gas and the mixture is supplied to the catalyst layer.

Parenthetically, the exhaust gas from lean burn engines generally contains 3 to 15% of $O_2$ and several hundreds to several thousands ppm of $NO_x$ as well as several hundreds to several thousands ppm of CO and several hundreds to several thousands ppm of HC. HC comprises unburned components of fuel, thermally decomposed components of fuel molecules, partially oxidized components of fuel molecules, and the like, and, with respect to the molecular structure of HC, HC is not made up of a single molecular species but contains, for example, alkenes, such as ethylene, propylene, butene, and pentene; alkanes, such as ethane, propane, butane, and hexane; and aromatic HC's, such as benzene, toluene, and xylene, to some extent.

In order to increase the $NO_x$ removal rate, it is necessary and essential to utilize effectively as many components of HC, which is made up of such a wide variety of components, as possible, as reducing agents of $NO_x$ in the presence of excess oxygen.

In the present invention, the iridium-containing catalyst, and particularly the iridium-supporting metal carbide catalyst, which is arranged in the upper stream, is effective in selectively reducing $NO_x$ with HC, and in particular with unsaturated hydrocarbons containing olefins and alkylaromatic HC's, and the reduction reaction produces concomitantly scarcely $N_2O$.

The platinum-containing catalyst, and particularly the catalyst wherein platinum is supported on a porous carrier, such as zeolite and alumina, which is arranged in the lower stream, reduces $NO_x$ in the reaction between olefinic HC's and $NO_x$ in the presence of excess oxygen in a relatively low temperature range of 150 to 250° C. to produce mainly $N_2O$. However, even in the presence of the platinum catalyst, in the system wherein there are no unsaturated HC's as HC species, namely, in the reaction system of paraffinic HC's and $NO_x$, $NO_x$ is reduced and decomposed selectively to $N_2$ and $H_2O$ with $N_2O$ being produced scarcely.

Accordingly, the use of the present two-stage catalyst system causes selective reduction of $NO_x$ with relatively readily oxidizable olefinic or alkylaromatic unsaturated HC's in the upper stream and then causes selective reduction of $NO_x$ with relatively hardly oxidizable paraffinic HC's in the lower stream. Thus, a wide variety of HC species contained in the exhaust gas are effectively made maximum use as reducing agents of $NO_x$ and also the concomitant production of $N_2O$ in the $NO_x$ reduction reaction with the platinum-supporting catalyst is suppressed, so that the purification of the exhaust gas containing $NO_x$ can be attained at a high efficiency.

EXAMPLES

The present invention will now be described in more detail with reference to the following Preparation Examples, Examples, and Comparative Examples. However, the present invention is not restricted by the following Examples.

In the specification of the present invention, the $NO_x$ conversion, the $NO_x$ removal rate, and the $N_2O$ production rate are defined as given below. The conversion of CO and the conversion of HC are defined similarly to the formula for the definition of the $NO_x$ conversion.

$$NO_x \text{ conversion} = \frac{A-B}{A} \times 100 \ (\%)$$

wherein A represents the concentration of $NO_x$ at the catalyst layer inlet and B represents the concentration of $NO_x$ at the catalyst layer outlet.

$$N_2O \text{ production rate} = \frac{2 \times C}{A} \times 100 \ (\%)$$

wherein A is defined as above and C represents the concentration of $N_2O$ at the catalyst layer outlet.

$NO_x$ removal rate=$NO_x$ conversion–$N_2O$ production rate

Preparation Example 1

Preparation of Iridium-Supporting Silicon Carbide-Coated Honeycomb Catalyst (1)

(a) To 30 g of silicon carbide (SiC) powder (manufactured by Lonza and having a BET specific surface area of 15 m²/g) were added 2.0 g of 30% silica sol and 50 ml of deionized water and they were kneaded in a ball mill for 16 hours. Into the thus obtained slurry was dipped a core piece having a diameter of 2.54 cm and a length of 6.35 cm that had been cut out from a commercially available 400-cell cordierite honeycomb, and after the core was pulled out, the excess slurry was removed by blowing air to dry the core piece, and the core piece was calcined at 500° C. for 30 min to obtain a silicon carbide-coated honeycomb coated with 100 g of a solid (expressed as dry weight) per liter of the honeycomb.

(b) The honeycomb core obtained in (a) was dipped in 100 ml of a deionized water solution of chloroiridic acid ($H_2IrCl_6$) containing 0.27 g of iridium and was kept for 3 min at room temperature so that the honeycomb might be impregnated with the iridium solution in an amount equivalent to the incipient wetness. The excess iridium solution was removed by blowing air, and the honeycomb was dried, was calcined in air at 800° C. for 30 min, and was subjected to reduction treatment in a 100% hydrogen stream for 700° C. for 2 hours to obtain an iridium-supporting silicon carbide-coated honeycomb catalyst (1) having 0.6 g of iridium per liter.

Preparation Example 2

Preparation of Crystalline-Iridium-Silicate-Coated Honeycomb Catalyst (2)

1,000 ml of a deionized water solution containing 30.9 g of 97% sodium hydroxide (NaOH) and 190 g of tetrapropylammonium bromide (TPAB) was added dropwise to 1,000 ml of a deionized water solution containing 8.2 g of chloroiridic acid ($H_2IrCl_6$; Ir content: 38.0%) over 30 min with violent-stirring and then 200 ml of a deionized water solution containing 29.7 g of 97% sulfuric acid ($H_2SO_4$) was added dropwise thereto over 10 min. Further, 1,000 g of 30% colloidal silica was added dropwise thereto over 30 min at a constant speed to bring the pH of the gel to 11.2 to 11.8.

The resulting gel was charged into a stainless autoclave, a lid was put on the autoclave, the internal temperature was elevated to 170° C. over 6 hours with the gel being stirred, and after the stirring was continued at 170° C. for 100 hours under autogenous reaction pressure, the contents were allowed to cool to room temperature, then taken out, filtered, washed with deionized water, and dried at 110° C. for 16 hours. The obtained crystals were ground, heated in air from room temperature to 540° C. at a heating rate of 60° C./hr, and kept at 540° C. for 4 hours, and after the ground crystals were allowed to cool, 296 g of crystalline iridium silicate powder was obtained.

Similarly to the case in (a) of Preparation Example 1, a honeycomb was coated with this powder, followed by drying, and calcining at 500° C. for 1 hour, thereby obtaining a honeycomb catalyst (2) coated with 100 g of iridium silicate (expressed as dry weight) per liter of the honeycomb.

Preparation Example 3

Preparation of Platinum-Supporting Alumina-Coated Honeycomb Catalyst (3)

A 120 g of active alumina having a BET specific surface area of 150 m²/g and an average particle diameter of 30 μm was placed in a mixer and 30 ml of an aqueous amine solution of platinum hydroxide containing 4.8 g of platinum was added dropwise little by little thereto with stirring so that the platinum hydroxide might be dispersed uniformly and supported on the active alumina. Then, 25 ml of a 25% aqueous acetic acid solution was added thereto dropwise little by little to obtain a 4% Pt-supporting alumina powder. A 120 g of this powder, 15 g of alumina sol (alumina content: 20% by weight), and 30 g of deionized water were charged into a ball mill pot and the obtained mixture was subjected to wet grinding for 16 hours to obtain a slurry. In the same way as in (a) of Preparation Example 1, a honeycomb was coated with this slurry, followed by drying and calcining in air at 500° C. for 1 hour, thereby obtaining a Pt-supporting alumina-coated honeycomb catalyst (3) with 4 g/l of Pt supported.

Preparation Example 4

Preparation of Platinum-Supporting Alumina-Coated Honeycomb Catalyst (4)

(a) Active alumina having a BET specific surface area of 150 m²/g and an average particle diameter of 30 μm in an amount of 120 g, chloroplatinic acid ($H_2PtCl_6$) in an amount of 0.06 g in terms of platinum, alumina sol (alumina content: 20% by weight) in an amount of 15 g, and deionized water in an amount of 30 g were charged into a ball mill pot and subjected to wet grinding for 16 hours to obtain a slurry. In the same way as in (a) in Preparation Example (1), using this slurry, a honeycomb was coated with alumina, followed by drying and calcining in air at 600° C. for 30 min, thereby obtaining an alumina-coated honeycomb with 100 g/liter of alumina (expressed as dry weight).

(b) A platinum electroless plating solution containing chloroplatinic acid in an amount of 1.0 g/liter in terms of platinum, ammonia water in an amount of 200 ml/liter, and a 50 wt. % aqueous hydrazine solution in an amount of 4 g/liter was prepared.

(c) After the alumina-coated honeycomb obtained in (a) above was dipped in 300 ml of a 5 wt. % aqueous hydrazine solution at room temperature for 15 min and then was taken out, the alumina-coated honeycomb was dipped in 160 ml of the electroless platinum plating solution (containing 0.16 g of platinum) prepared in (b) at 30° C. for 6 hours, was taken out, then dried at 110° C. for 12 hours, and calcined in air at 700° C. for 5 hours to obtain a platinum-supporting alumina-coated honeycomb (4) with 5 g/liter of platinum.

Preparation Example 5

Preparation of Pt-Rh-Supporting Alumina-Coated Honeycomb Catalyst (TWC)

120 g of active alumina having a BET specific surface area of 150 m²/g and an average particle diameter of 30 μm was placed in a mixer, and 30 ml of an aqueous amine solution of platinum hydroxide containing 2.0 g of platinum was added dropwise little by little with stirring so that the platinum hydroxide might be uniformly dispersed and supported on the alumina. Then after 15 ml of an aqueous solution of rhodium nitrate containing 0.41 g of rhodium was added dropwise little by little thereto so that the rhodium nitrate might be uniformly dispersed and supported on the alumina, 10 ml of 25% acetic acid was added dropwise little by little to prepare a 1.7% Pt/0.34% Rh-supporting alumina powder (Pt/Rh weight ratio=5/1). In the same way as in Preparation Example 3, this was coated on a honeycomb and was dried, followed by calcining in air at 500° C. for 1 hour, thereby obtaining a Pt/Rh-supporting alumina-coated honeycomb catalyst (5).

Preparation Example 6

Preparation of Pt-Ir-Supporting Alumina-Coated Honeycomb Catalyst

The Pt-supporting alumina-coated honeycomb prepared in Preparation Example 3 was dipped in 100 ml of a deionized water solution of chloroiridic acid ($H_2IrCl_6$) containing 1.18 g of iridium (Ir) and was kept at room temperature for 3 min so that the honeycomb might be impregnated with the iridium solution in an amount equivalent to the incident wetness. The excess solution was removed by blowing air, and the honeycomb was dried, calcined in air at 700° C. for 30 min, and subjected to reduction treatment in a 100% hydrogen stream for 800° C. for 2 hours to obtain a Pt-Ir-supporting alumina-coated honeycomb catalyst (6) with 4 g/l of Pt and 1.2 g/l of Ir.

Preparation Example 7

Preparation of Cu-Ion-Exchanged/ZSM-5-Coated Honeycomb Catalyst

H-type aluminosilicate ZSM-5 powder (Si/Al ratio=38) was obtained in accordance with the Rollmann and Valyocski method (L. D. Rollmann and E. W. Valyocski, Inorg. Synthesis., 22 (1982) pp. 67 to 68). A 100 g of this powder was placed into 2,000 ml of a 0.03M deionized water solution of copper acetate and was made into a slurry, and the slurry was stirred at room temperature for 16 hours, then was filtered and dried, followed by calcining in air at 500° C. for 30 min, thereby obtaining a 1.2 wt. % Cu-ion-exchanged/ZSM-5 powder (ion exchange ratio: 95% in terms of $Cu^{2+}$). The resulting powder was coated on a honeycomb to obtain a Cu-ion-exchanged/ZSM-5-coated honeycomb catalyst (7).

Example 1

Purification of Model Exhaust Gas from Lean Burn Engine with (Upper Stream Ir Catalyst+Lower Stream Pt Catalyst)

A half of the length of the iridium-supporting silicon carbide-coated honeycomb catalyst (1) was loaded in the upper stream of the gas flow in a stainless steel reaction tube having an inner diameter of 30 mm and a half of the length of the platinum-supporting alumina catalyst (3) was loaded in the lower stream in such a manner that glass wool was wound on the side surface of each of the halves to prevent any gas from escaping. Into this reaction tube was flowed, as a model exhaust gas from a gasoline lean burn engine, a mixed gas made up of 1,200 ppm of NO (hereinafter, the concentration of gas components is by volume unless otherwise specified), 800 ppm of propylene plus 800 ppm of propane as HC, 1,000 ppm of CO, 1,000 ppm of $H_2$, 3.2% of $O_2$, 10% of $CO_2$, 10% of $H_2O$, and the balance of $N_2$ at a flow rate of 16.1 l/min (SV through the catalyst in the upper stream: 60,000/hr; SV through the catalyst in the lower stream: 60,000/hr; and SV through the whole combined catalyst layer: 30,000/hr), and while the catalyst layer inlet gas temperature was increased continuously from 150° C. to 500° C. at a heating rate of 30° C./min, the concentrations of $NO_x$, CO, HC, and $N_2O$ in the catalyst layer outlet gas were measured by an $NO_x$ meter, a CO meter, an HC meter, and an $N_2O$ meter respectively to find the conversions of $NO_x$, CO, and HC and the production rate of $N_2O$, thereby evaluating the catalyst layer inlet gas temperature dependence (light-off performance) for the $NO_x$, CO, and HC conversions and the $N_2O$ production rate. Parenthetically, in the case wherein the 2-stage catalyst system is placed in the upper stream and the lower stream as in this Example, the term "the catalyst inlet gas temperature" refers to the inlet gas temperature of the catalyst placed in the first zone in the upper stream.

As is shown in FIG. 1, for $NO_x$ the conversion was as high as 40% or more over a wide temperature range of 270 to 430° C. The conversions of CO and HC rose from 180° C. and 250° C., respectively, and the conversions of CO and HC at 500° C. were 98% and 97%, respectively. The maximum production rate of $N_2O$ in the temperature range of 200 to 300° C. was 16%.

Example 2

Purification of Model Exhaust Gas from Lean Burn Engine with (Upper Stream Ir Catalyst+Lower Stream Pt Catalyst)

Example 1 was repeated, except that, in place of the catalyst (1), the iridium silicate catalyst (2) having the same size as above was placed on the gas flow inlet side, and, in place of the catalyst (3), the Pt-supporting catalyst (4) having the same size as above was placed on the outlet side, thereby evaluating the light-off performance of HC, CO, and $NO_x$ and the production rate of $N_2O$.

Figure 2:
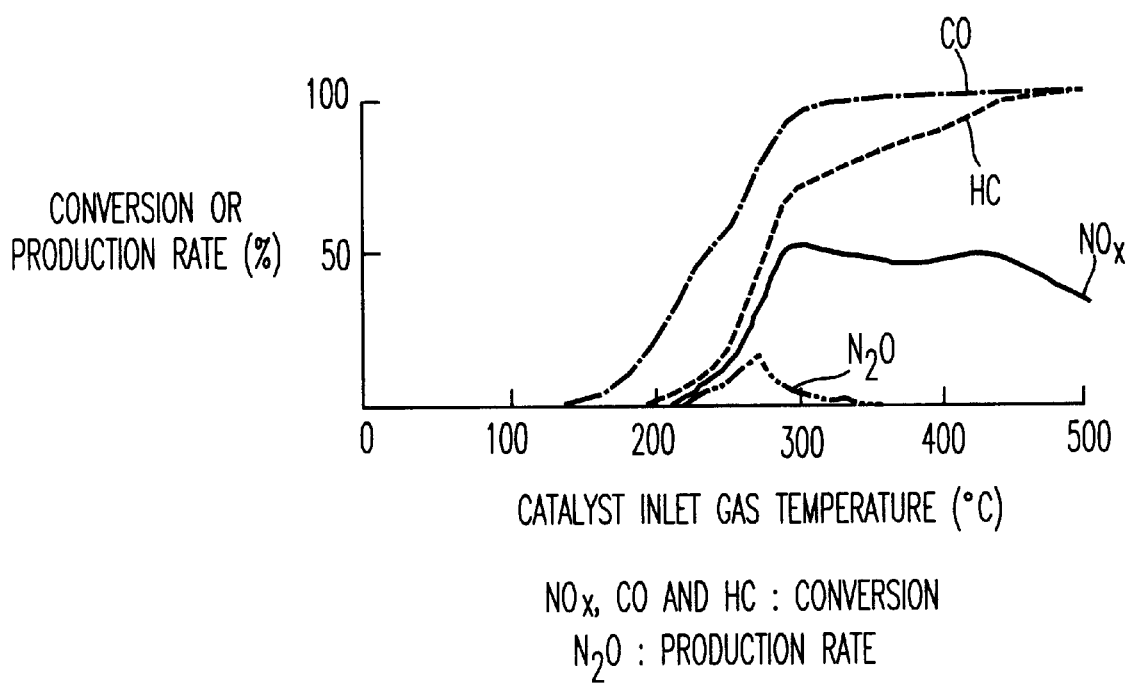
FIG. 2 is a graph showing the purifying performance on the model exhaust gas from a lean burn engine obtained in Example 2.

As is shown in FIG. 2, for NO the conversion was as high as 40% or more over a wide temperature range of 280 to 470° C., the conversions of CO and HC rose from 220° C. and 260° C., respectively, and the conversions of CO and HC at 500° C. were 98% and 97%, respectively. The maximum production rate of $N_2O$ in the temperature range of 200 to 300° C. was 14%.

Comparative Example 1

Purification of Model Exhaust Gas from Lean Burn Engine Only with Ir Catalyst

Example 1 was repeated, except that, in place of the half of the length of the catalyst (1) placed on the gas flow inlet side and the half of the length of the catalyst (3) placed on the outlet side, only the whole length (6.35 cm in length) of the Ir-supporting catalyst (1) was loaded, thereby evaluating the light-off performance of HC, CO, and $NO_x$.

Figure 3:
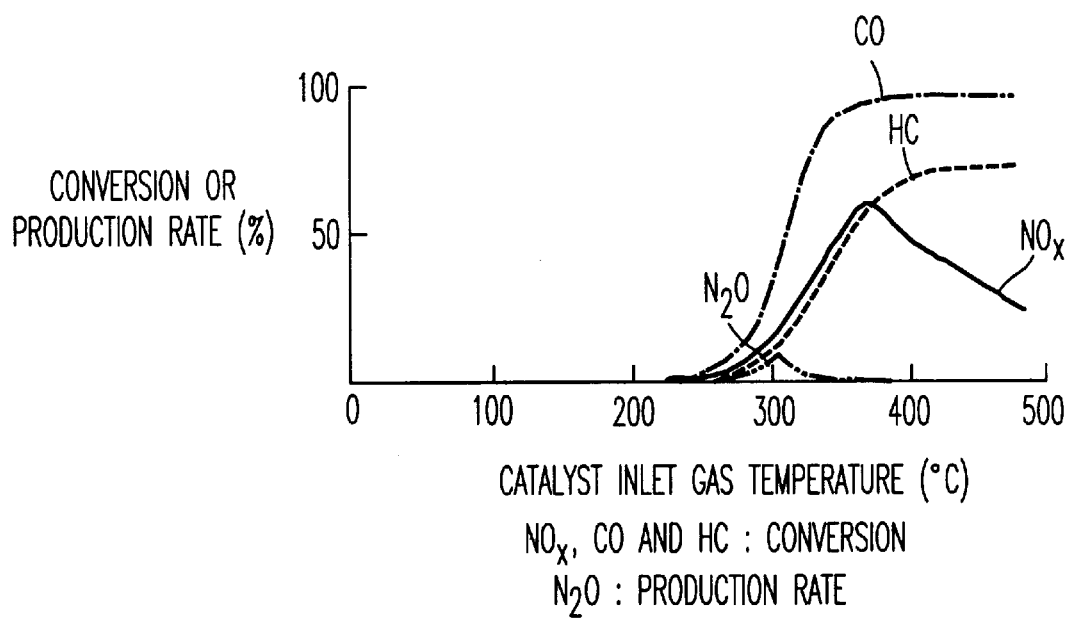
FIG. 3 is a graph showing the purifying performance on the model exhaust gas from a lean burn engine obtained in Comparative Example 1.

As is shown in FIG. 3, although the maximum conversion of $NO_x$ was 60% at 380° C. and the conversion of $NO_x$ was 23% at 500° C., the conversion of $NO_x$ at 300° C. was only 11%. Further, although the conversion of CO rose from 310° C., the conversion of HC rose only just at about 340° C. and was unsatisfactory 73% even at 500° C. This is presumed such that the reactivity of propane out of HC species in the model exhaust gas with $NO_x$ is insufficient. However, the maximum production rate of $N_2O$ was as low as 8%.

Comparative Example 2

Purification of Model Exhaust Gas from Lean Burn Engine Only with Pt Catalyst

Example 1 was repeated, except that, in place of the half of the length of the catalyst (1) placed on the gas flow inlet side and the half of the length of the catalyst (3) placed on the outlet side, only the whole length (6.35 cm in length) of the Pt-supporting catalyst (3) was loaded, thereby evaluating the light-off performance of HC, CO, and $NO_x$.

Figure 4:
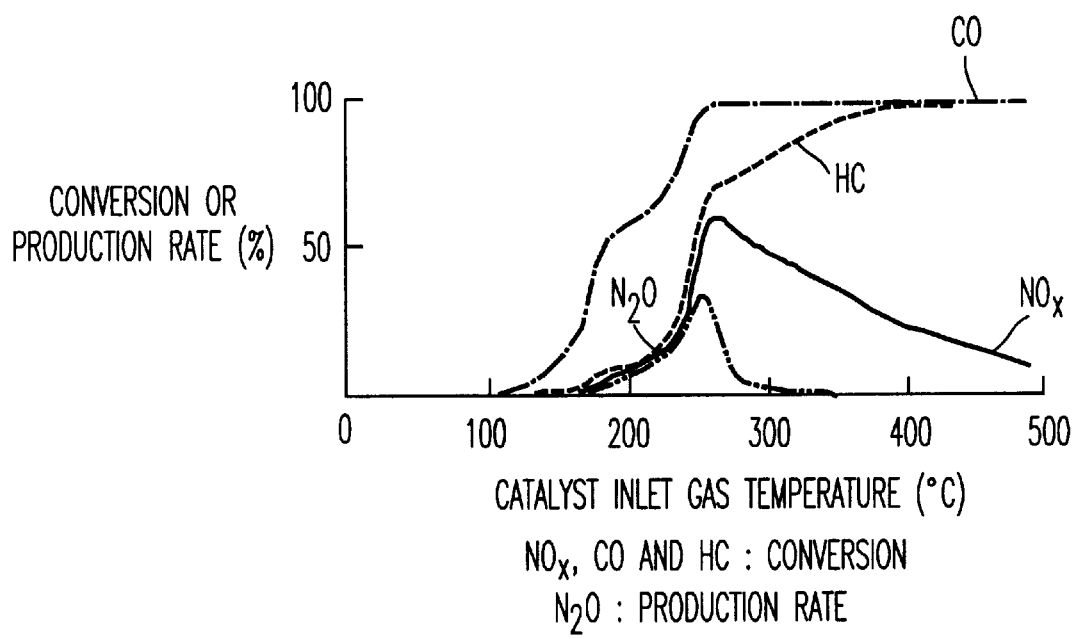
FIG. 4 is a graph showing the purifying performance on the model exhaust gas from a lean burn engine obtained in Comparative Example 2.

As is shown in FIG. 4, the conversions of CO and HC rose at 170° C. and 240° C., respectively, and the conversions of CO and HC at 500° C. were 98% and 99%, respectively. With respect to $NO_x$, although the maximum conversion was 62% at a catalyst inlet temperature of 280° C., the conversion of $NO_x$ was gradually dropped at from 350 to 500° C., and the conversion of $NO_x$ at 500° C. was only 9%. The maximum production rate of $N_2O$ was 35% at 260° C., which was twice or more as high as that of Example 1.

Comparative Example 3

Purification of Model Exhaust Gas from Lean Burn Engine with Pt-Rh/$Al_2O_3$ Catalyst Example 1 was repeated, except that, in place of the half of the length of the catalyst (1) placed on the gas flow inlet side and the half of the length of the catalyst (3) placed on the outlet side, only the whole length (6.35 cm in length) of the Pt-Rh/$Al_2O_3$ catalyst (5) was loaded, thereby evaluating the light-off performance of HC, CO, and $NO_x$.

Figure 5:
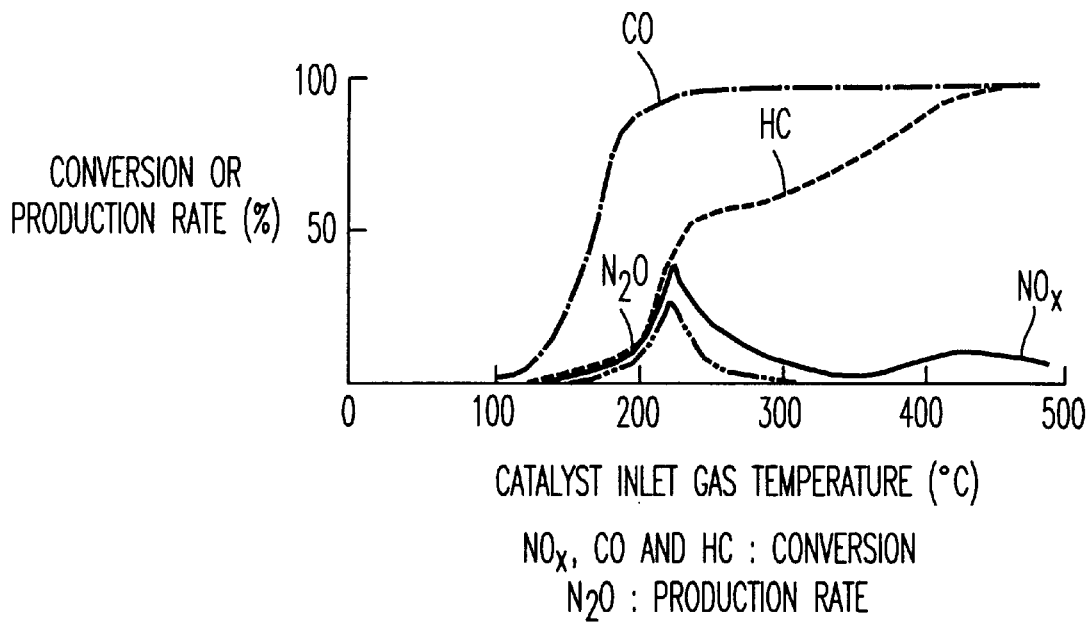
FIG. 5 is a graph showing the purifying performance on the model exhaust gas from a lean burn engine obtained in Comparative Example 3.

As is shown in FIG. 5, the conversions of CO and HC rose at 160° C. and 220° C., respectively, and the conversions of CO and HC at 500° C. were 98% and 99%, respectively. With respect to $NO_x$, although the maximum conversion was 39% at the catalyst inlet temperature of 230° C., the conversion of $NO_x$ was sharply dropped at from 350 to 500° C., and the conversion of $NO_x$ at 500° C. was only 7%. The maximum production rate of $N_2O$ was 27% at 200° C. and the removal rate of $NO_x$ calculated by subtracting the production rate of $N_2O$ from the conversion rate of $NO_x$ was low.

Thus, it is apparent that the conventional Pt-Rh-co-supporting three-way catalyst is unsatisfactory in the removal rate of $NO_x$ in the presence of excess oxygen.

Comparative Example 4

Purification of Model Exhaust Gas from Lean Burn Engine with Pt-Ir/$Al_2O_3$ Catalyst Example 1 was repeated, except that, in place of the half of the length of the catalyst (1) placed on the gas flow inlet side and the half of the length of the catalyst (3) placed on the outlet side, only the whole length (6.35 cm in length) of the Pt-Ir/$Al_2O_3$ catalyst (6) was loaded, thereby evaluating the light-off performance of HC, CO, and $NO_x$.

Figure 6:
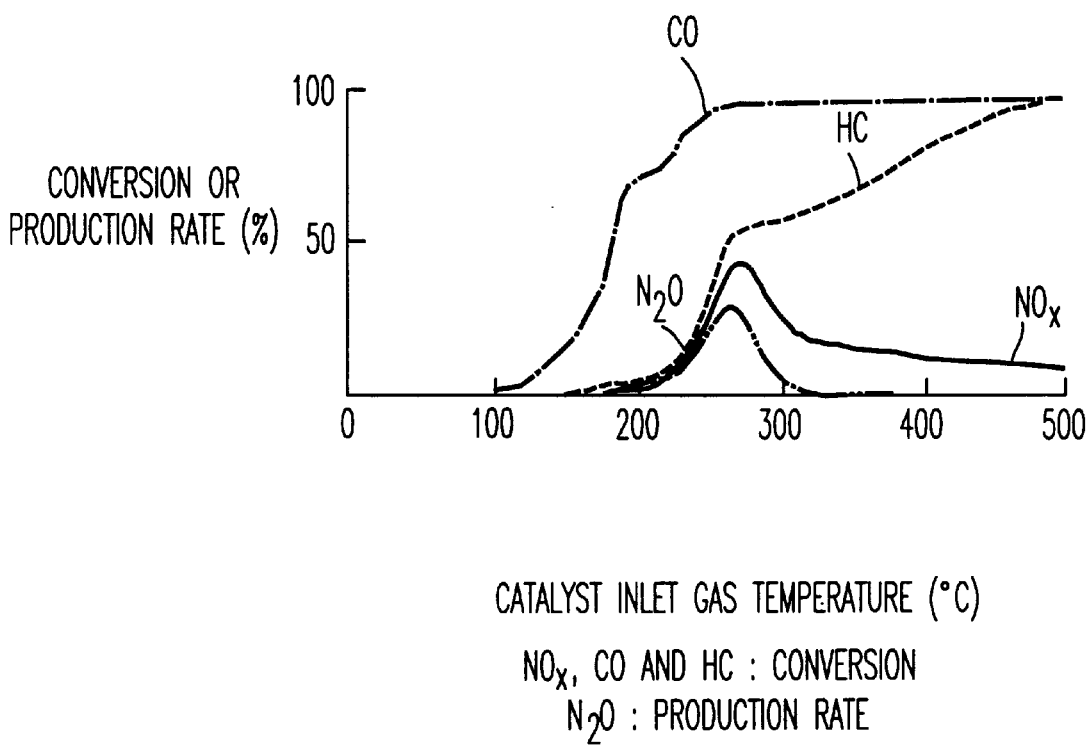
FIG. 6 is a graph showing the purifying performance on the model exhaust gas from a lean burn engine obtained in Comparative Example 4.

As is shown in FIG. 6, the conversions of CO and HC rose at 160° C. and 240° C., respectively, and the conversions of CO and HC at 500° C. were 98% and 99%, respectively. With respect to $NO_x$, although the maximum conversion of $NO_x$ was 45% at a catalyst inlet temperature of 270° C., the conversion of $NO_x$ was sharply dropped at from 300 to 400° C., and the conversion of $NO_x$ at 500° C. was only 9%. The maximum production rate of $N_2O$ was 30% at 260° C. and the removal rate of $NO_x$ calculated by subtracting the production rate of $N_2O$ from the conversion rate of $NO_x$ was low.

Thus, it is apparent that the known Pt-Ir-co-supporting catalyst is unsatisfactory in the removal rate of $NO_x$ in the presence of excess oxygen.

Comparative Example 5

Purification of Model Exhaust Gas from Lean Burn Engine with (Upper Stream Cu/ZSM-5 Catalyst+ Lower Stream Pt Catalyst)

Example 1 was repeated, except that, in place of the half of the length of the catalyst (1) placed on the gas flow inlet side and the half of the length of the catalyst (3) placed on the outlet side, a half of the length of the Cu/ZSM-5 catalyst (7) was loaded on the gas inlet side and a half of the length of the Pt catalyst (3) was loaded in the lower stream, thereby evaluating the light-off performance of HC, CO, and $NO_x$.

Figure 7:
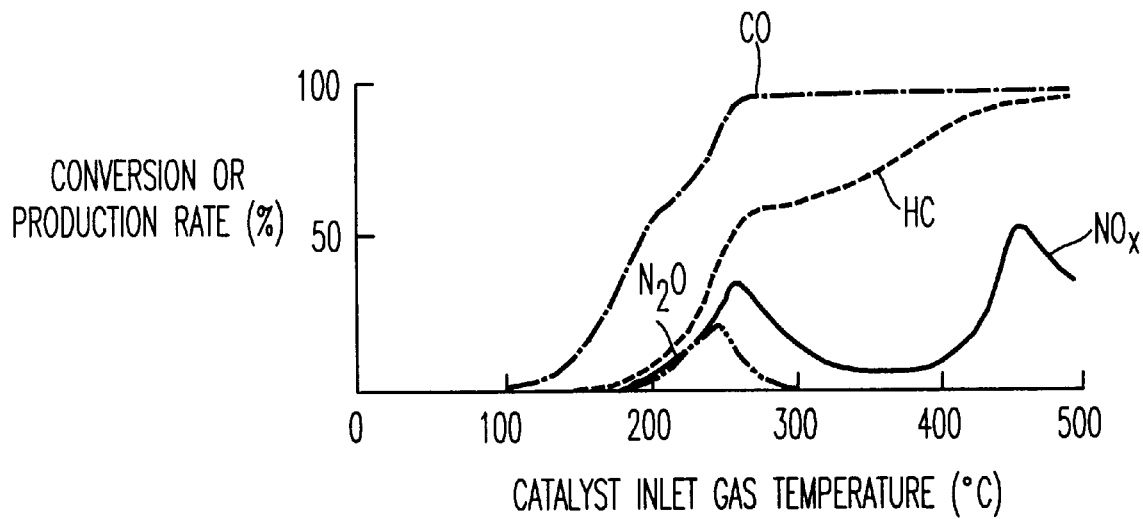
FIG. 7 is a graph showing the purifying performance on the model exhaust gas from a lean burn engine obtained in Comparative Example 5.

As is shown in FIG. 7, the conversions of CO and HC rose at 170° C. and 240° C., respectively, and the conversions of CO and HC at 500° C. were 98% and 96%, respectively, and with respect to $NO_x$, although the maximum conversions, 36% and 55%, were obtained at catalyst inlet temperatures of about 260° C. and 460° C., respectively, the conversion of $NO_x$ was dropped to on the order of 10% at from 320 to 400° C. The maximum production rate of $N_2O$ was 22% at 240° C. and the removal rate of $NO_x$ was low.

Thus, it is apparent that the known combined catalyst system of the Cu/zeolite catalyst and the Pt-supporting catalyst is unsatisfactory in the removal performance of $NO_x$ in a medium temperature range of 300 to 400° C.

Example 3

Purification of Model Exhaust Gas from Lean Burn Engine with (Upper Stream Ir Catalyst+Lower Stream Pt Catalyst) After Thermally Aged The Ir catalyst (1) and the Pt catalyst (3) used in Example 1 were taken out from the model gas reactor, thermally aged in an air stream containing 10% of $H_2O$ at 800° C. for 5 hours, and then loaded again in the model gas reactor with the upper stream Ir catalyst and the lower stream Pt catalyst placed in this order, and the same evaluation as in Example 1 was made.

Figure 8:
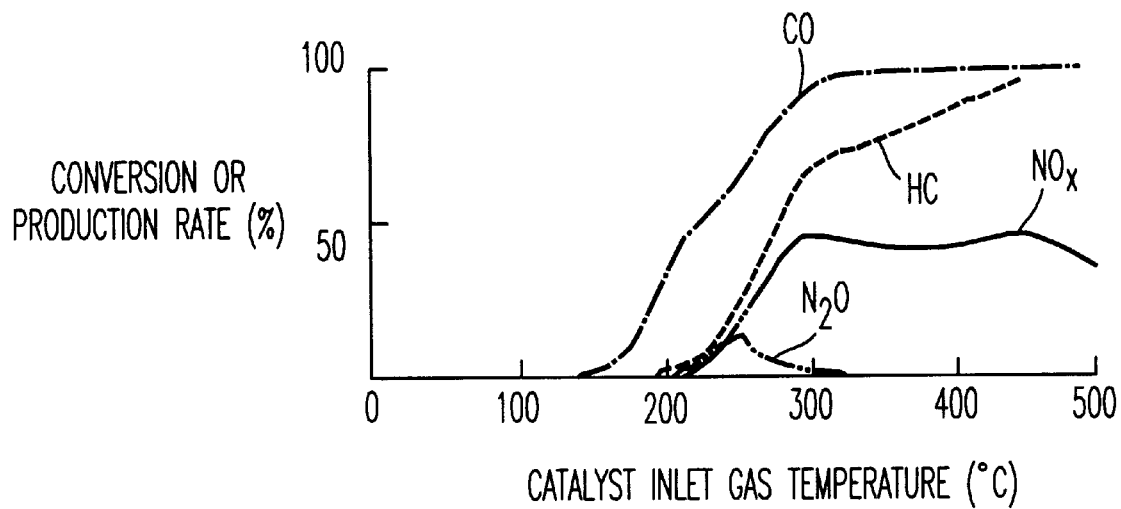
FIG. 8 is a graph showing the purifying performance on the model exhaust gas from a lean burn engine obtained in Example 3.

FIG. 8 shows the light-off performance. After the thermal aging at 800° C., the light-off performance of $NO_x$, HC, and CO was lowered scarcely and the conversion of $NO_x$ was 40% or more over a wide temperature range of 280 to 470° C.

Thus, the method of the present invention provides an exhaust gas purifying method excellent in heat resistance.

Comparative Example 6

Purification of Model Exhaust Gas from Lean Burn Engine with (Upper Stream Cu/ZSM-5 Catalyst+ Lower Stream Pt Catalyst) After Thermally Aged The upper steam side Cu/ZSM-5 catalyst (7) and the lower stream side Pt catalyst (3) used in Comparative Example 5 were taken out from the model gas reactor, thermally aged in an air stream containing 10% of $H_2O$ at 800° C. for 5 hours, and then loaded again in the model gas reactor with the upper steam side Cu/ZSM-5 catalyst (7) and the lower stream side Pt catalyst (3) in this order, and the same evaluation as in Comparative Example 5 was made.

Figure 9:
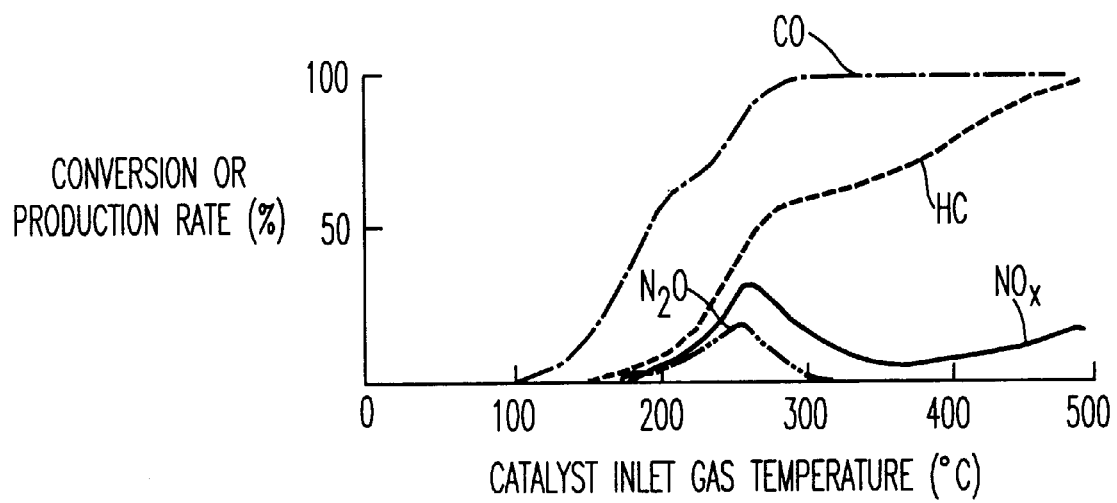
FIG. 9 is a graph showing the purifying performance on the model exhaust gas from a lean burn engine obtained in Comparative Example 6.

FIG. 9 shows the light-off performance. After the thermal aging at 800° C., the upper stream side Cu/ZSM-5 catalyst was deactivated considerably and the conversion of $NO_x$ in a middle and high temperature range of 300° C. and over was extremely unsatisfactorily 20% or less.

What is claimed is:

1. A method of purifying exhaust gas from an internal combustion engine which is operated at a fuel-lean air/fuel ratio, comprising bringing the exhaust gas in contact with an iridium-containing catalyst in a first zone and then in contact with a platinum-containing catalyst in a second zone situated downstream of the first zone, wherein each of said first and second zones are at a temperature from 150 to 700° C. and wherein said platinum-containing catalyst comprises platinum present in a form selected from the group consisting of elemental Pt, Pt oxides, Pt alloys and composite oxides of Pt and one or more additional metals, wherein said platinum-containing catalyst comprises said platinum supported by a carrier selected from the group consisting of refractory metal oxide carriers, refractory metal carbide carriers and refractory metal nitride carriers, and wherein said iridium-containing catalyst is (A) a catalyst comprising iridium supported on at least one carrier selected from the group consisting of metal oxides, metal carbides, and metal nitrides, or (B) a catalyst comprising crystalline iridium silicate represented by formula (1):

$$xM_2O.yAl_2O_3.IrO_2.zSiO_2.wH_2O \qquad (1)$$

wherein M represents an alkali metal, and x, y, z, and w are respectively such numbers that the numbers satisfy $0<x/y\leq5.0$, $0<y\leq10$, $50\leq z\leq800$, $z/y\geq30$, and $0.01\leq w/z\leq0.5$.

2. The method of claim 1, wherein said iridium-containing catalyst is a catalyst comprising iridium supported on at least one carrier selected from the group consisting of metal oxides, metal carbides, and metal nitrides.

3. The method of claim 2, wherein said carrier is at least one compound selected from the group consisting of metal carbides and metal nitrides.

4. The method of claim 3, wherein the metal carbide carriers and the metal nitride carriers each have a BET specific surface area of 30 m²/g or less and a pore volume of 0.55 cm³/g or less.

5. The method of claim 3, wherein the iridium is supported in the form of a metal, an oxide or a mixture thereof, and the average particle diameter of the iridium is 2 to 100 nm.

6. The method of claim 3, wherein the amount of the iridium supported on the carrier is 0.005 to 10.0% by weight of the total weight of the carrier and the platinum.

7. The method of claim 1, wherein said iridium-containing catalyst is a catalyst comprising crystalline iridium silicate represented by the formula (1):

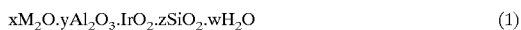

$$xM_2O.yAl_2O_3.IrO_2.zSiO_2.wH_2O \qquad (1)$$

wherein M represents an alkali metal, and x, y, z, and w are respectively such numbers that the numbers satisfy $0<x/y\leq5.0$, $0<y\leq10$, $50\leq z\leq800$, $z/y\geq30$, and $0.01\leq w/z\leq0.5$.

8. The method of claim 7, wherein the Si/Ir atomic ratio in the crystalline iridium silicate is from 50 to 800 and the Si/Al atomic ratio in the crystalline iridium silicate is 15 or more.

9. The method of claim 1, wherein said platinum-containing catalyst is a catalyst comprising platinum supported on at least one carrier selected from the group consisting of metal oxides, metal carbides, and metal nitrides.

10. The method of claim 2, wherein the metal oxide carrier is selected from the group consisting of alumina, silica, titania, magnesia, cerium oxide, tin oxide, and zirconia, the metal carbide carrier is selected from the group consisting of silicon carbide, titanium carbide, tungsten carbide, boron carbide, vanadium carbide, and tantalum carbide, and the metal nitride carrier is selected from the group consisting of titanium nitride, chromium nitride, and zirconium nitride.

11. The method of claim 9, wherein the metal oxide carrier is selected from the group consisting of alumina, silica, titania, magnesia, cerium oxide, tin oxide, and zirconia, the metal carbide carrier is selected from the group consisting of silicon carbide, titanium carbide, tungsten carbide, boron carbide, vanadium carbide, and tantalum carbide, and the metal nitride carrier is selected from the group consisting of titanium nitride, chromium nitride, and zirconium nitride.

12. The method of claim 9, wherein the carrier is selected from the group consisting of metal oxides and metal carbides and said platinum supported on said carrier is provided by electroless plating.

13. The method of claim 9, wherein the platinum is supported in the form of elemental metal, oxides, alloys of platinum and other metals, or composite oxides of platinum and other metals, and the average particle diameter of the platinum is 2 to 300 nm.

14. The method of claim 9, wherein the amount of the platinum supported on the carrier is 0.1 to 10% by weight of the total weight of the carrier and the platinum.

15. The method of claim 1, wherein said exhaust gas is exhaust gas from a gasoline lean burn engine.

16. The method of claim 1, wherein said exhaust gas is exhaust gas from a diesel engine.

17. The method of claim 1, wherein a hydrocarbon is added to said exhaust gas before said exhaust gas is introduced into the first zone.

18. The method according to claim 1, wherein said method is performed at 200 to 500° C.

19. The method according to claim 1, wherein the first zone inlet gas temperature is 300 to 500° C. and the second zone inlet gas temperature is 200 to 350° C.

20. The method of claim 1, wherein each of said first and second zones are at a temperature from 200 to 500° C.

21. The method of claim 1, wherein said first zone is at a temperature of from 300 to 500° C. and said second zone is at a temperature of from 200 to 350° C.

22. The method of clam 1, wherein said fuel lean air/fuel ratio contains 3–15% of oxygen.

* * * * *